United States Patent
Clark et al.

(10) Patent No.: US 12,018,568 B2
(45) Date of Patent: Jun. 25, 2024

(54) CMC COMPONENT WITH INTEGRAL COOLING CHANNELS AND METHOD OF MANUFACTURE

(71) Applicant: Raytheon Technologies Corporation, Farmington, CT (US)

(72) Inventors: Thomas E. Clark, Wells, ME (US); Daniel J. Whitney, East Waterboro, ME (US); Kathryn S. Read, Marlborough, CT (US); Andrew J. Lazur, La Jolla, CA (US); William M. Barker, Biddeford, ME (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/097,397

(22) Filed: Jan. 16, 2023

(65) Prior Publication Data
US 2023/0151740 A1    May 18, 2023

Related U.S. Application Data

(63) Continuation of application No. 16/785,161, filed on Feb. 7, 2020, now Pat. No. 11,578,609.

(Continued)

(51) Int. Cl.
*F01D 11/12* (2006.01)
*B28B 1/00* (2006.01)
*F01D 25/12* (2006.01)

(52) U.S. Cl.
CPC .............. *F01D 11/12* (2013.01); *B28B 1/002* (2013.01); *F01D 25/12* (2013.01);
(Continued)

(58) Field of Classification Search
CPC . B28B 1/002; F05D 2230/20; F05D 2240/11; F05D 2260/20; F05D 2300/20;
(Continued)

(56) References Cited

U.S. PATENT DOCUMENTS

| 5,916,510 A | 6/1999 | Jessen |
| 5,921,754 A | 7/1999 | Freitas et al. |

(Continued)

FOREIGN PATENT DOCUMENTS

| EP | 1801390 A2 | 6/2007 |
| EP | 2134542 A2 | 12/2009 |

(Continued)

OTHER PUBLICATIONS

Extended European Search Report for EP Application No. 20156360.8, dated Jul. 13, 2020, 9 pages.

(Continued)

*Primary Examiner* — Courtney D Heinle
*Assistant Examiner* — Andrew Thanh Bui
(74) *Attorney, Agent, or Firm* — Kinney & Lange, P.A.

(57) ABSTRACT

A fiber-reinforced component for use in a gas turbine engine includes a first braided fiber sleeve forming a cooling channel and a plurality of fiber plies enclosing the first braided fiber sleeve, with the plurality of fiber plies forming first and second walls separated by the first braided fiber sleeve. The fiber-reinforced component further includes a matrix material between fibers of the braided fiber sleeve and the plurality of fiber plies.

16 Claims, 6 Drawing Sheets

Related U.S. Application Data

(60) Provisional application No. 62/803,327, filed on Feb. 8, 2019.

(52) U.S. Cl.
CPC ...... *F05D 2230/20* (2013.01); *F05D 2240/11* (2013.01); *F05D 2260/20* (2013.01); *F05D 2300/20* (2013.01)

(58) Field of Classification Search
CPC ... F05D 2300/6033; F01D 11/12; F01D 25/12
See application file for complete search history.

(56) References Cited

U.S. PATENT DOCUMENTS

| | | | |
|---|---|---|---|
| 6,627,019 | B2 | 9/2003 | Jarmon et al. |
| 6,746,755 | B2 | 6/2004 | Morrison et al. |
| 7,600,979 | B2 | 10/2009 | Steibel et al. |
| 8,202,588 | B2 | 6/2012 | Keller et al. |
| 8,257,809 | B2 | 9/2012 | Morrison et al. |
| 8,449,260 | B2 | 5/2013 | Xie et al. |
| 10,011,043 | B2 | 7/2018 | Gray et al. |
| 10,017,425 | B2 | 7/2018 | Tuertscher et al. |
| 10,107,119 | B2 | 10/2018 | Walston |
| 10,724,387 | B2 | 7/2020 | Farrar et al. |
| 2003/0059577 | A1* | 3/2003 | Morrison .......... B32B 3/18 428/188 |
| 2005/0077341 | A1 | 4/2005 | Larrieu et al. |
| 2007/0041827 | A1* | 2/2007 | Camus .......... F01D 25/12 415/116 |
| 2013/0142660 | A1 | 6/2013 | McCaffrey |
| 2016/0177743 | A1 | 6/2016 | Thomas et al. |
| 2016/0348586 | A1 | 12/2016 | Uskert et al. |
| 2016/0376921 | A1 | 12/2016 | O'Leary et al. |
| 2017/0022840 | A1* | 1/2017 | Thomas .......... F02C 7/12 |
| 2017/0101873 | A1 | 4/2017 | Morgan et al. |
| 2018/0223681 | A1 | 8/2018 | Gallier et al. |
| 2018/0272568 | A1 | 9/2018 | Parolini et al. |
| 2018/0328189 | A1 | 11/2018 | Frey et al. |

FOREIGN PATENT DOCUMENTS

| | | |
|---|---|---|
| EP | 3048254 A1 | 7/2016 |
| EP | 3115565 A1 | 1/2017 |
| EP | 3241993 A1 | 11/2017 |
| EP | 3650653 A1 | 5/2020 |

OTHER PUBLICATIONS

Extended European Search Report for EP Application No. 21207520.4, dated Feb. 23, 2022, 8 pages.

* cited by examiner

CMC COMPONENT WITH INTEGRAL COOLING CHANNELS AND METHOD OF MANUFACTURE

CROSS-REFERENCE TO RELATED APPLICATION(S)

This application is a continuation of U.S. application Ser. No. 16/785,161, filed Feb. 7, 2020, for "CMC COMPONENT WITH INTEGRAL COOLING CHANNELS AND METHOD OF MANUFACTURE" by T. Clark, D. Whitney, K. Read, A. Lazur, and W. Barker, which claims the benefit of U.S. Provisional Application No. 62/803,327 filed Feb. 8, 2019, for "CMC BOAS WITH INTEGRAL COOLING CHANNELS AND METHOD OF MANUFACTURE" by T. Clark, D. Whitney, K. Read, A. Lazur, and W. Barker.

BACKGROUND

The present disclosure relates generally to the manufacture of components for a gas turbine engine and more particularly to the manufacture of ceramic matrix composites (CMC) with integral cooling channels.

Lightweight CMC is a highly desirable material for gas turbine engine applications. CMCs exhibit excellent physical, chemical, and mechanical properties at high temperatures, making CMCs particularly desirable for producing hot section components, including blade outer air seals (BOAS). Designing a CMC BOAS capable of meeting a sufficient balance of strength and thermal gradient targets has been challenging in regions where both the maximum CMC interface temperature and bulk proportional stress targets are violated.

A need exists to produce a CMC BOAS with a relatively low through-wall thermal gradient while providing large cross-sectional moments of inertia to react to high pressure loads.

SUMMARY

In one aspect, a fiber-reinforced component for use in a gas turbine engine includes a first braided fiber sleeve forming a cooling channel and a plurality of fiber plies enclosing the first braided fiber sleeve, with the plurality of fiber plies forming first and second walls separated by the first braided fiber sleeve. The fiber-reinforced component further includes a matrix material between fibers of the braided fiber sleeve and the plurality of fiber plies.

In another aspect, a method for manufacturing a fiber-reinforced component with integral fiber-formed cooling channels for use in a gas turbine engine includes forming a first braided fiber sleeve, consolidating the sleeve to form a cooling channel of a desired shape, enclosing the sleeve with a plurality of fiber plies to form a fiber preform of a component with internal cooling provided by the cooling channel, and densifying the fiber preform.

The present summary is provided only by way of example, and not limitation. Other aspects of the present disclosure will be appreciated in view of the entirety of the present disclosure, including the entire text, claims and accompanying figures.

Figure 1:
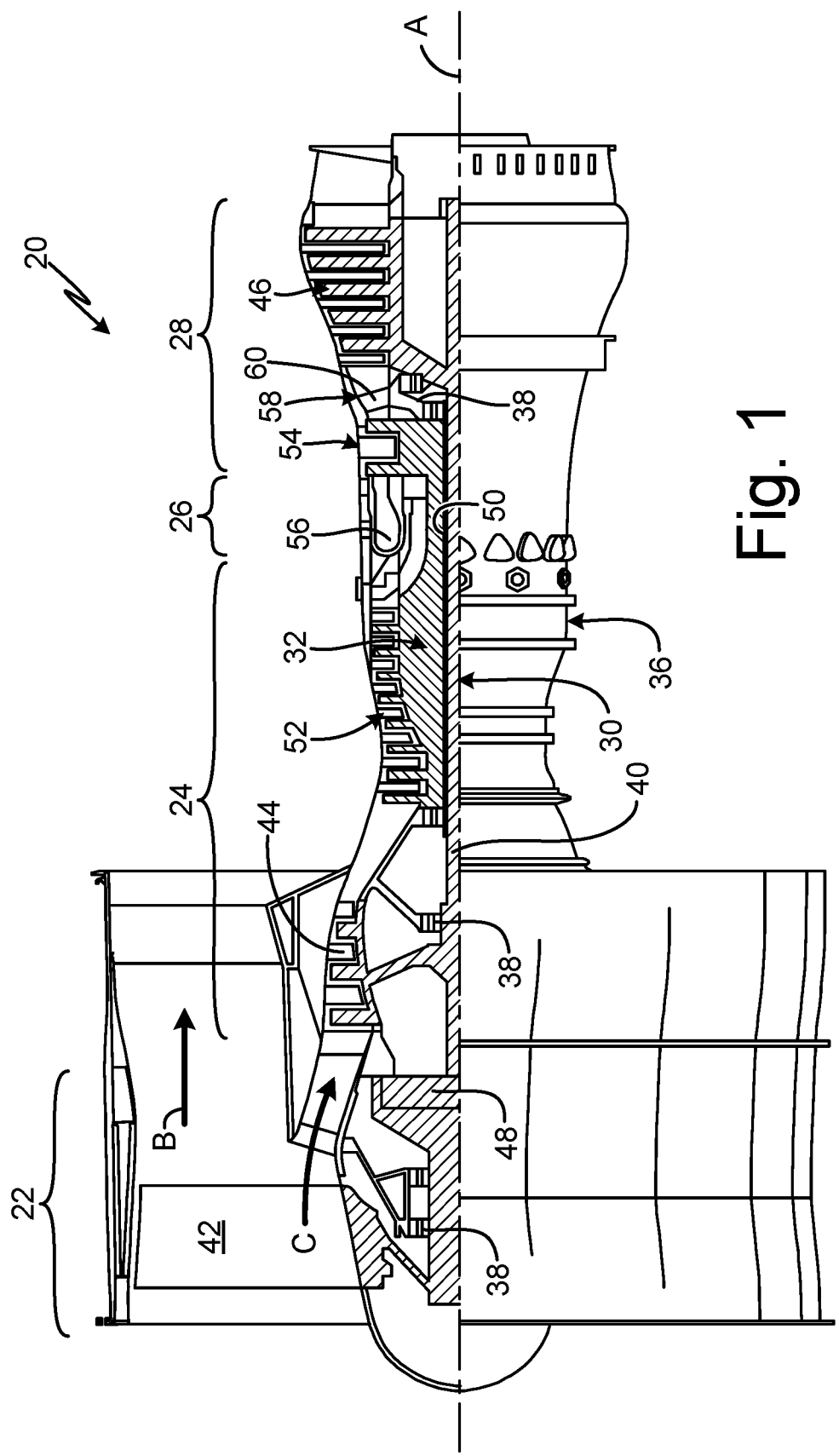
FIG. 1 is a quarter-sectional view of a gas turbine engine.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The present disclosure provides a method of manufacturing a CMC component, and specifically a BOAS, with integral cooling channels constructed of CMC braided sleeves. The channels enable large film cooling access across the gas path face of the BOAS and reduce through-wall thermal gradients along the BOAS inner diameter wall. The use of CMC braided sleeves provides for seamless channel construction and can increase the specific stiffness of the BOAS, provide an efficient distribution of load, and provide resistance to crack propagation. Although the present disclosure is directed to cooling channels formed from braided fiber sleeves, woven and knit fiber tubes are also contemplated and it should be understood by one of ordinary skill in the art that woven and knit fiber tubes can replace the braided fiber sleeves in the disclosed embodiments. Although the present disclosure is directed to cooling channels formed in a BOAS, the disclosed method can be used to form other components including but not limited to components of a hot section of a gas turbine engine, such as turbine blades, vanes, and platforms; combustors; and exhaust nozzles or mixers.

FIG. 1 is a quarter-sectional view of a gas turbine engine 20 that includes fan section 22, compressor section 24, combustor section 26 and turbine section 28. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example a low-bypass turbine engine, or a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes low speed spool 30 and high speed spool 32 mounted for rotation about an engine central longitudinal axis A relative to an engine static structure 36 via several bearing systems 38. It should be understood that various bearing systems 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about engine central longitudinal axis A.

Combustor 56 is arranged between high pressure compressor 52 and high pressure turbine 54. In one example, high pressure turbine 54 includes at least two stages to provide a double stage high pressure turbine 54. In another example, high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of low pressure turbine 46 as related to the pressure measured at the outlet of low pressure turbine 46 prior to an exhaust nozzle.

Mid-turbine frame 58 of engine static structure 36 is arranged generally between high pressure turbine 54 and low pressure turbine 46. Mid-turbine frame 58 further supports bearing systems 38 in turbine section 28 as well as setting airflow entering low pressure turbine 46.

The core airflow C is compressed by low pressure compressor 44 then by high pressure compressor 52 mixed with fuel and ignited in combustor 56 to produce high speed exhaust gases that are then expanded through high pressure turbine 54 and low pressure turbine 46. Mid-turbine frame 58 includes airfoils/vanes 60, which are in the core airflow path and function as an inlet guide vane for low pressure turbine 46. Utilizing vanes 60 of mid-turbine frame 58 as inlet guide vanes for low pressure turbine 46 decreases the length of low pressure turbine 46 without increasing the axial length of mid-turbine frame 58. Reducing or eliminating the number of vanes in low pressure turbine 46 shortens the axial length of turbine section 28. Thus, the compactness of gas turbine engine 20 is increased and a higher power density may be achieved.

Each of the compressor section 24 and the turbine section 28 can include alternating rows of rotor assemblies and vane assemblies (shown schematically) that carry airfoils that extend into the core flow path C. To improve efficiency, static outer shroud seals (not shown), such as a BOAS, can be located radially outward from rotor airfoils to reduce tip clearance and losses due to tip leakage.

Figure 2:
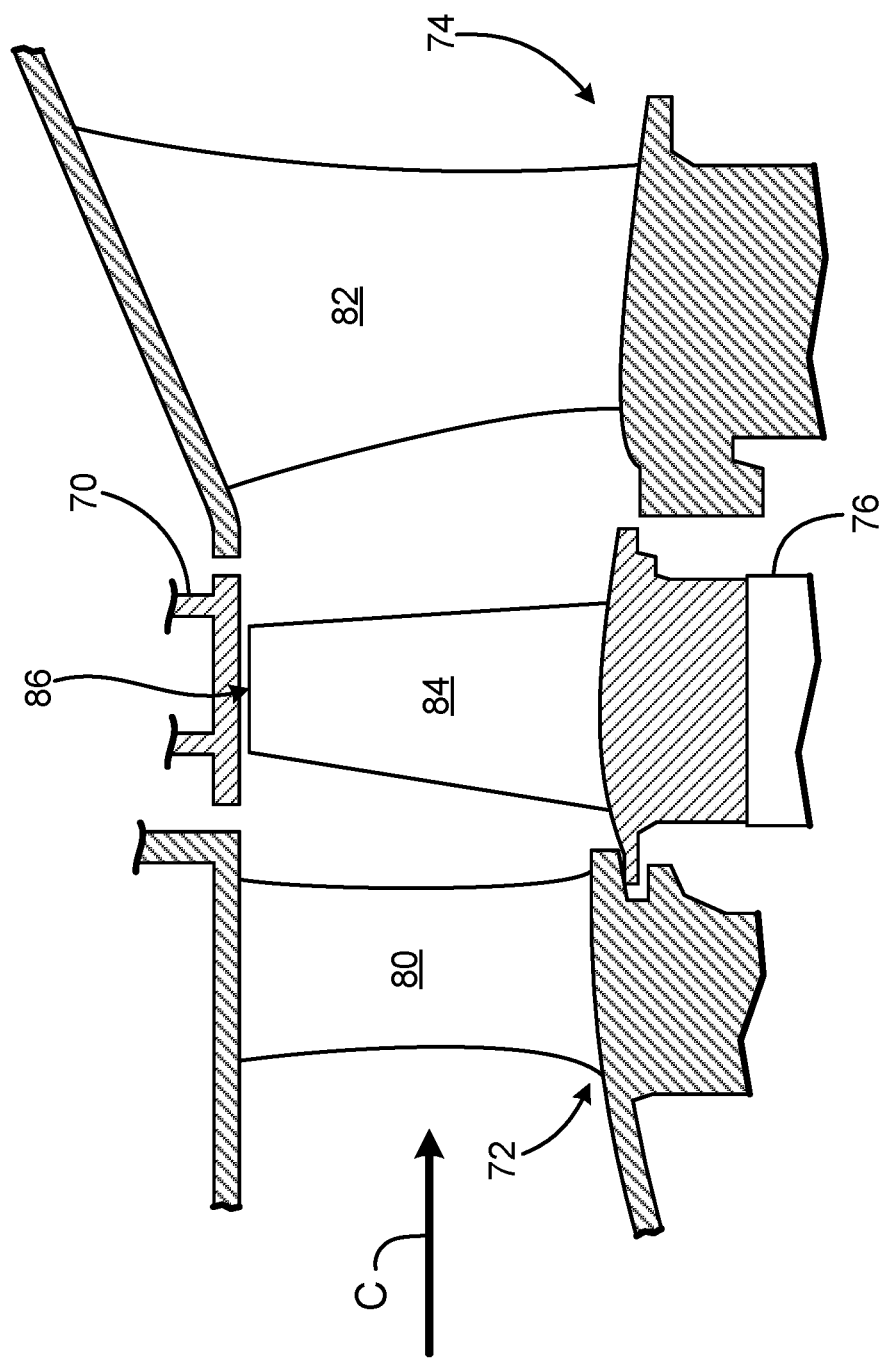
FIG. 2 is a schematic view of a portion of the gas turbine engine with a blade outer air seal (BOAS).

FIG. 2 illustrates a portion of a gas turbine engine, such as, but not limited to, gas turbine engine 20 of FIG. 1, having BOAS 70. The portion of the gas turbine engine illustrated in FIG. 2 is intended to be non-limiting. The portion of the gas turbine engine illustrated in FIG. 2 has stator assemblies 72 and 74, and rotor 76. Stator assemblies 72 and 74 can each have a plurality of airfoils 80 and 82, respectively, to direct core airflow C. Rotor 76 can have a plurality of airfoils 84 to create or extract energy from core airflow. BOAS 70 can be configured to reduce core airflow leakage across rotor tip 86. BOAS 70 can be located radially inward of an annular case (not shown) and radially outward of rotor tip 86. Conventionally, a plurality of segmented BOAS 70 can be used, collectively forming a ring around rotor 76 to seal multiple airfoils 84. BOAS 70 can be mounted to an annular ring or segmented seal carrier (not shown) or directly to the case as known in the art.

Figure 3:
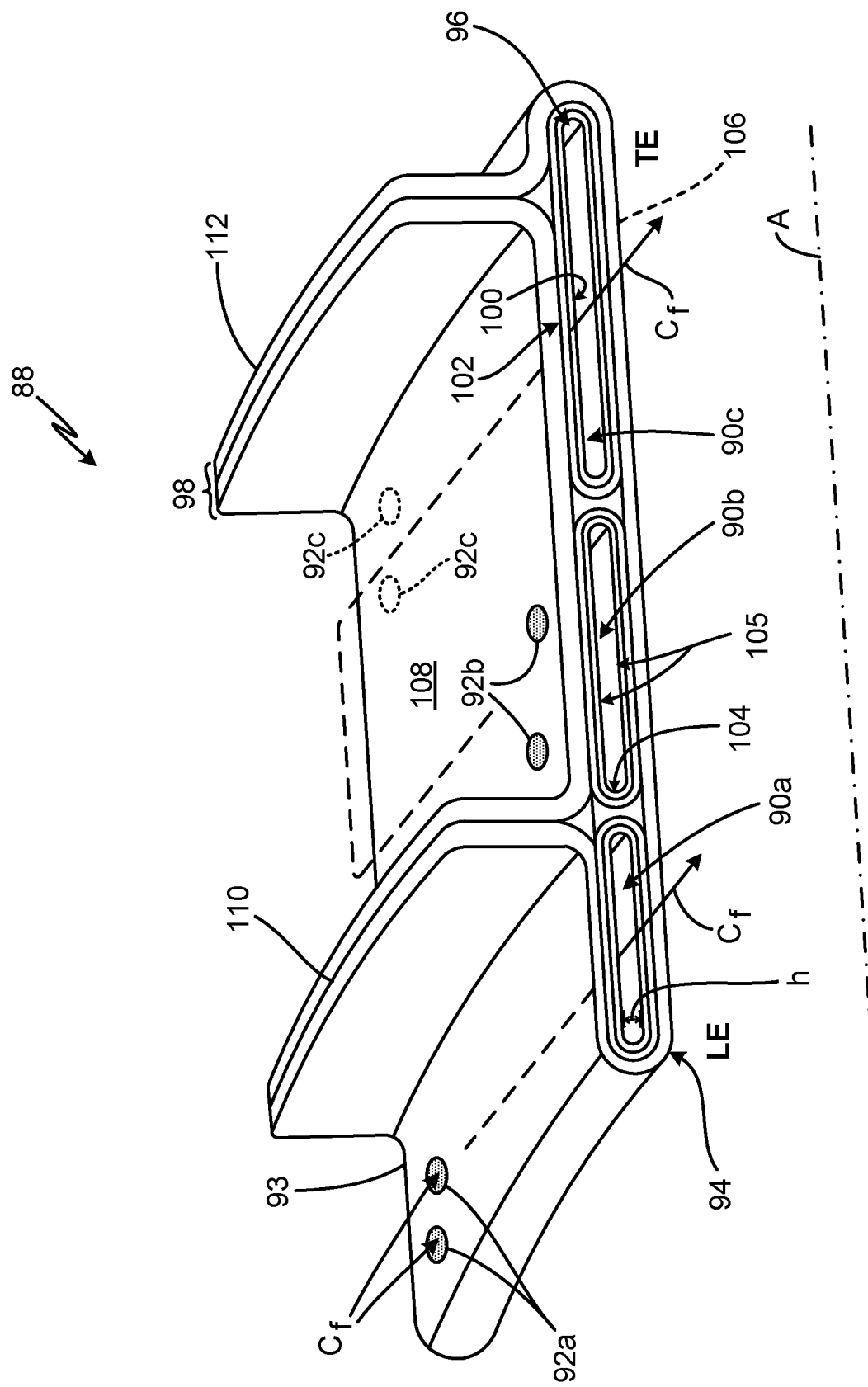
FIG. 3 is a schematicized sectional view of a BOAS fiber preform with cooling channels.
Figure 4:
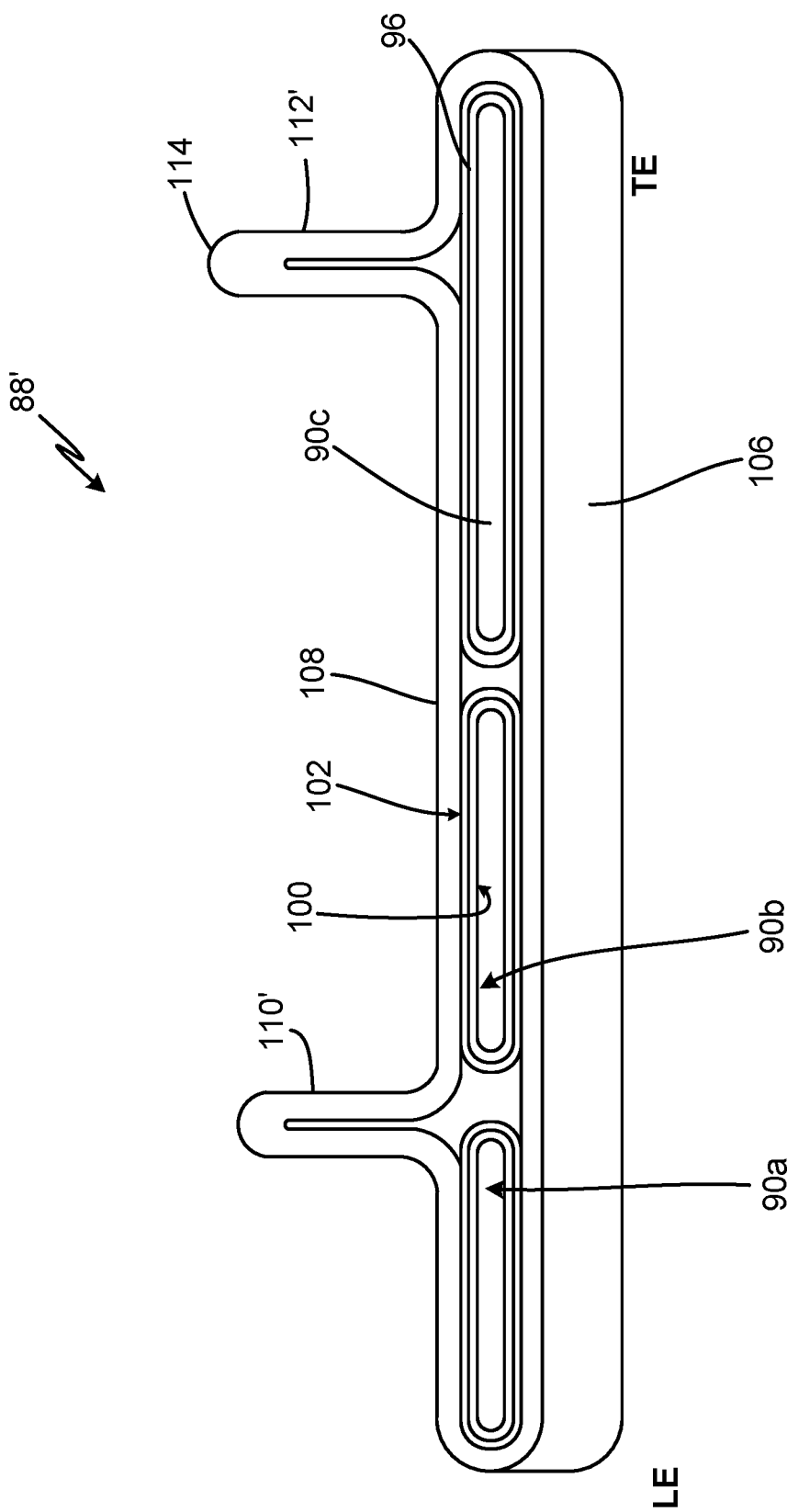
FIG. 4 is a schematicized sectional view of an alternative BOAS fiber preform with cooling channels.

FIGS. 3 and 4 provide schematicized sectional views of alternative embodiments of a fiber preform 88 and 88' used for the manufacture of BOAS 70. Preforms 88 and 88' are intended to provide non-limiting examples of a geometry of BOAS 70. It will be understood by those of ordinary skill in the art that the geometry of BOAS 70, including the number and orientation of cooling channels can be varied as needed to meet thermal and mechanical stress requirements. Some of the possible alternative configurations are described herein although not illustrated. In some embodiments, a thermal barrier coating, environmental barrier coating, and/or abradable coating can be provided on a surface of BOAS 70. Thermal barrier coatings and environmental barrier coatings can protect the CMC component from degradation. Abradable coatings can be applied in a blade rub zone to maintain close clearances thereby improving turbine efficiency.

FIG. 3 illustrates fiber preform 88, which includes cooling channels 90a-90c fed by a source of cooling fluid through inlet apertures 92a-92c. As illustrated, cooling channels 90a-90c can extend in a circumferential direction relative to engine axis A. Preform 88 has three cooling channels 90a, 90b, 90c located adjacent one another and configured to cover an axial extent of BOAS 70, extending from a leading edge LE to a trailing edge TE. While positioning cooling channels along a full axial extend of BOAS 70 can provide cooling fully along a radially inner wall positioned in the gas path, alternative configurations, which do not provide cooling along the full axial extent of BOAS 70, are also contemplated.

As illustrated in FIG. 3, a cooling fluid flow $C_f$ can be fed to leading edge cooling channel 90a through a pair of apertures 92a. Cooling channel 90a can be substantially closed at an intersegment side 93 of BOAS 70 adjacent to apertures 92a to direct cooling fluid flow $C_f$ through cooling channel 90a as indicated by the $C_f$ arrow. In some embodiments, an adjacent BOAS 70 can be configured to allow flow exiting cooling channel 90a from an outlet at an opposite intersegment side 94 to enter a cooling fluid channel in the adjacent BOAS. In other embodiments, cooling channel 90a can be substantially closed at intersegment outlet 94 and cooling fluid flow $C_f$ can be forced to exit through a plurality of intersegment gas path-facing film cooling apertures (not shown) as known in the art. Cooling fluid $C_f$ can enter cooling channel 90b through a pair of apertures 92b. Cooling channel 92b can be substantially closed (not shown) at intersegment side 94 to direct cooling fluid flow $C_f$ in a circumferential direction as illustrated by the $C_f$ arrow. In some embodiments, cooling channel 90b can be fluidly connected to cooling channel 90c to allow cooling fluid flow $C_f$ exiting cooling channel 90b at intersegment side 93 to enter cooling channel 90b at intersegment side 93 and flow back toward intersegment side 94 as illustrated by the $C_f$ arrow. Cooling channels 90b and 90c can be substantially closed (not shown) at intersegment side 93 to limit cooling fluid flow $C_f$ exiting BOAS 70 at intersegment side 93, while allowing cooling fluid $C_f$ to pass from cooling channel 90b to cooling channel 90c. In alternative embodiments, cooling channel 90c can be fluidly separated from cooling fluid channel 90b and cooling fluid can be fed to cooling channel 90c through optional apertures 92c (shown in phantom). Intersegment side or wall members (not shown) used to close or restrict cooling channels 90a-90c can be formed separately and joined to preform 88 following densification of fiber preform 88 via brazing or other suitable methods known in the art. Cooling fluid $C_f$ can exit cooling fluid channels 90b and 90c through intersegment or gas pathfacing film cooling apertures. In some embodiments, one or both cooling channels 90b, 90c can be open at intersegment sides 93 or 94 to allow cooling fluid $C_f$ to enter cooling channels of adjacent BOAS as described with respect to cooling channel 90a. The internal cooling channels can function to actively cool BOAS 70 during operation to reduce bulk temperature, or to passively cool BOAS 70 to reduce through wall thermal gradients. Internal cooling channels can enable intersegment cooling via cooling holes directed between adjacent BOAS segments, as well as film cooling along a radially inner face of BOAS 70 exposed to the hot gas path. Although FIG. 3 illustrates three cooling channels 90a-90c, it should be appreciated that the number of cooling channels and fluid interconnection of cooling channels can be varied based on cooling needs, and that any number of cooling channels can be contemplated. In the disclosed BOAS, cooling channels configured to extend circumferentially (as illustrated) can generally range in number from two to six. The number of cooling fluid feed apertures 92a-92c can vary accordingly. Additionally, the location and number of feed apertures for each cooling channel can be varied as needed to maintain pressure requirements. In alternative embodiments, a single serpentine cooling channel may be used or walls of a braided sleeve may be compressed together to form multiple cooling channels. In some embodiments, a component could have spiral cooling channels originating at one or more center points and exiting at a rear of the component. Braided fiber sleeves can have a constant or variable cross-section to form cooling channels that are tapered in thickness and/or width. By varying the cross-section of fiber bundles within the braid (and weave or knit), cooling channels can be created with internal roughness that enhances heat transfer, which can provide significant advantage. Additionally, in braided fiber sleeves, it is possible to also introduce fibers only in one rotating direction to create swirling of air.

BOAS fiber preform 88 is formed from a plurality of braided fiber sleeves 96 (i.e., tubular braid with seamless fiber continuity from end to end), which are enclosed or wrapped in one or more layered woven or braided fiber plies 98. Suitable materials used to make braided fiber sleeves 96 and fiber plies 98 can include, but are not limited to carbon, silicon carbide (SiC), alloyed and/or zirconium carbide, hafnium carbide, aluminum silicate, alumina, and other materials known in the art for use in various environmental conditions, including varying operational temperatures. Fibers can be impregnated with a SiC matrix and various binders. Interface coatings, such as boron nitride, can be applied to the fibers before or after a layup process to protect fibers from oxidation during operation.

Cooling channels 90a-90c of fiber preform 88 are formed from braided fiber sleeves 96. Braided fiber sleeves offer multiple advantages over woven or unidirectional fiber plies. Braided fiber sleeves 96 have continuous fibers that are mechanically interlocked with one another providing for an efficient distribution of load and resistance to impact and crack propagation. Interlaminar shear properties are improved when braided fiber sleeves are nested together, which can further limit crack propagation. Braided fiber sleeves can expand to accommodate irregular cross-sections and can form irregular shapes. Because fibers are braided on the bias, there is a reduced tendency for fiber breakage when forced to accommodate a small radius. Braided fiber sleeves 96 can be formed from a biaxial braid or a triaxial braid, which provides reinforcement in the axial direction. The angles of the fibers of the braid can be tailored to balance the stresses better than is possible with a 0/90 woven fabric, which makes the braid structurally more efficient than a woven fabric for cooling channels that are required to hold cooling fluid at a higher pressure than the working fluid in the engine core gas path.

Each of cooling channels 90a-90c is defined by a braided fiber sleeve comprising nested fiber braids aligned concurrently to form inner wall 100 and outer wall 102. As illustrated in FIG. 3, braided fiber sleeves 96 can be consolidated to form an oblong shape with radiused ends 104 separated by elongated sides 105. A length of elongated sides 105 can vary depending on the number cooling channels present. In the embodiment disclosed in FIG. 3, a cross-section of cooling channels 90a-90c has an aspect ratio of approximately 8:1. In alternative embodiments, cooling channels 90a-90c can be substantially cylindrical, having a circular cross-section. Bending constraints of braided fiber sleeves 96 generally limit radiused ends to a minimum radius around 0.25 millimeters, providing a cooling channel height h of 0.5 millimeters. In the embodiment disclosed in FIG. 3, cooling channels 90a-90c can have a channel height ranging from 0.5 to 2 millimeters, and radii of radiused ends 104 ranging from 0.25 to 1 millimeters.

Fiber plies 98 can encase cooling channels 90a-90c thereby forming inner radial wall 106 facing the engine gas path and outer radial wall 108. Plies can generally have a thickness ranging from 0.005" to 0.015". It should be appreciated that the number of plies or layers forming each of walls 106 and 108 can vary depending on ply thickness and structural requirements. Fiber plies 98 can be formed from separate fiber sheets, which can be a woven or braided fabric. Fiber plies 98 can be wrapped to extend from attachment mechanisms 110 and 112 underneath cooling channels 90a-90c to provide additional support. It should be appreciated that alternative fiber ply layup configurations are contemplated and that the design can be modified accordingly to accommodate varying structural requirements. Gaps between plies or locations where plies are absent can be filled with small braids or chopped fibers.

FIG. 4 is a schematicized sectional view of an alternative fiber preform 88' for the manufacture of BOAS 70. Preform 88' is similar to preform 88 but includes a braided fiber overwrap 114. Braided fiber overwrap 114 can replace a portion or all of fiber plies 98 and can be formed from one or more braided fibers sleeves. Braided fiber overwrap 114 can fully wrap around braided fiber sleeves 96 to form BOAS walls 106 and 108. Braided fiber overwrap 114 can be shaped to provide attachment mechanisms 110' and 112'. The use of braided fiber overwrap 114 provides a seamless fiber preform structure, providing added strength and resistance to crack formation.

Figure 5:
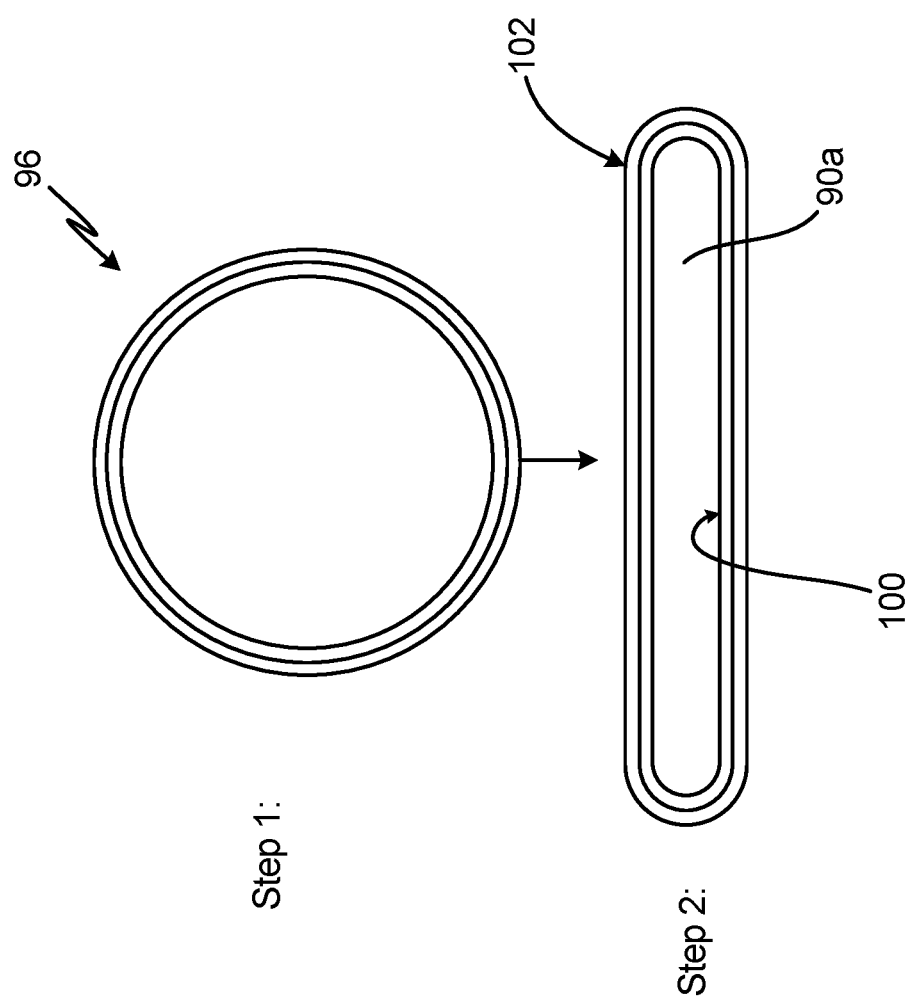
FIG. 5 is a schematicized sectional view of a cooling channel of FIGS. 1 and 2 in different stages of the manufacturing process.

FIG. 5 is a schematicized sectional view of cooling channel 90a at different stages in the manufacturing process. Cooling channel 90a (as well as all other cooling channels disclosed) can be formed by braiding fiber sleeve 96 on a mandrel to produce a cylindrical tube as illustrated by step 1 in the process. In step 2, braided fiber sleeve 96 can be consolidated to a desired aspect ratio or to provide a desired cooling channel height. In alternative embodiments, cooling channel 90a can be formed by braided fiber sleeve 96 on a mandrel more closely matched to the desired shape of cooling channel 90a, such that limited or no compression of braided sleeve 96 is necessary. This can limit an amount of buckling of inner wall 100 that can occur during shaping.

Plies 98 or braided sleeves 114 can be laid up around multiple consolidated braided fiber sleeves 96 to form preform 88 or 88' with cooling channels 90a-90c. In some embodiments, braided fiber sleeves 96 can be placed on mandrels capable of maintaining cooling channels 90a-90c during CVI or other densification process and capable of being extracted in post processing. In alternative embodiments, braided fiber sleeves 96 can be separately densified—partially or fully—before layup with fiber plies 98 or braided fiber sleeves 114. As such, use of additional tooling to maintain cooling channels 90a-90c can be avoided during densification of fiber preform 88 or 88'. This may allow for the addition of intersegment walls or other structures that could have limited extraction of tooling post densification. Hoop oriented fibers (low braid angle or woven 0/90 tubes) can provide reasonable resistance to compression and, therefore, support for subsequent processing without internal tooling. This results in significant additional design space for optimization of cooling channels without the constraint of mandrel removal.

Figure 6:
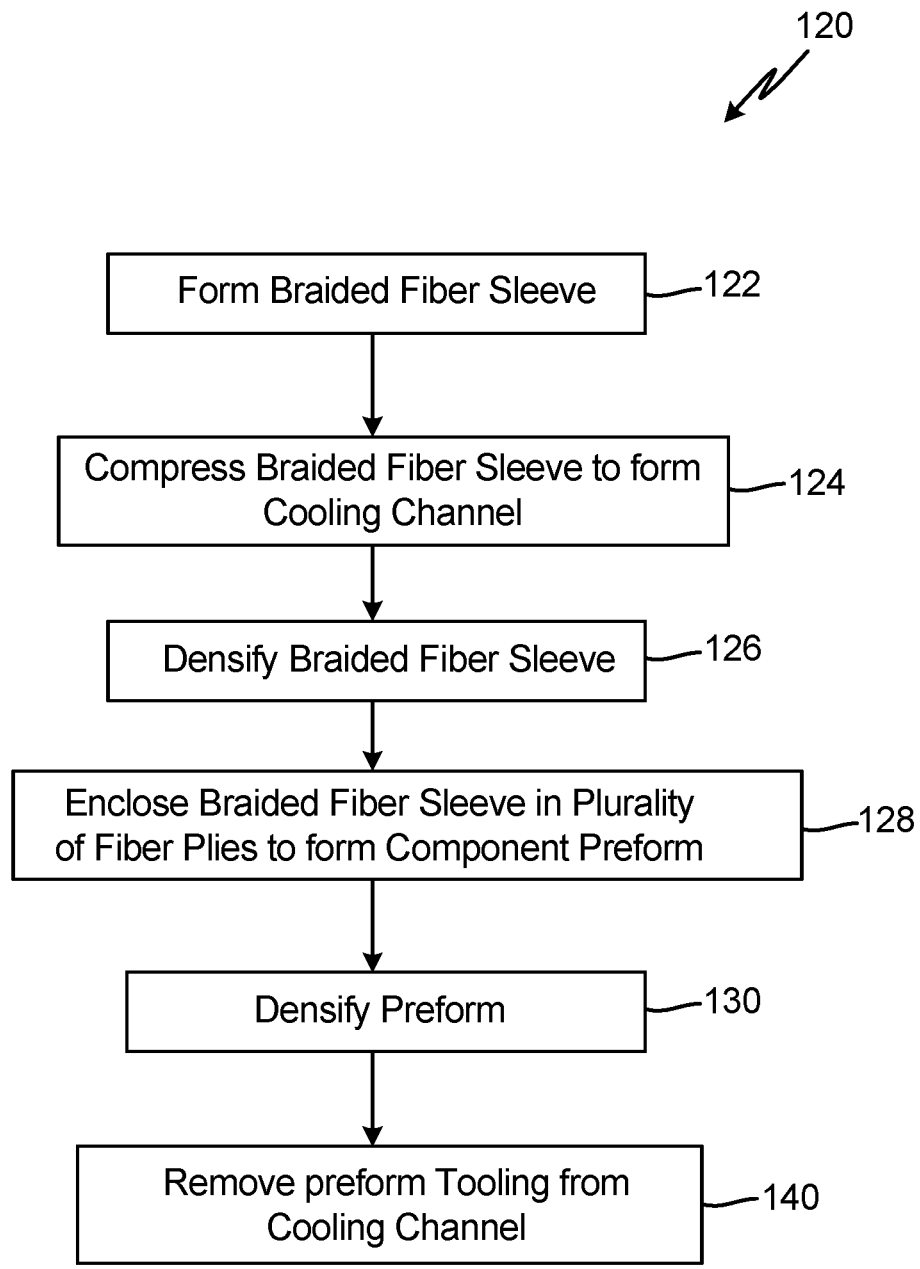
FIG. 6 is a flow chart of a method of manufacture of a BOAS using the BOAS fiber preforms of FIGS. 3 and 4.

FIG. 6 is a flow chart of method 120 of manufacture of BOAS 70 using preforms 88 and 88' of FIGS. 3 and 4. A plurality of braided fiber sleeves 96 can be formed on a graphite mandrel or other removable tooling (e.g., dissolvable or removed via vaporization/sublimation) in step 122 and consolidated in step 124 to provide a desired shape of cooling channels 90a-90c. Alternatively, cooling channels 90a-90c can be tapered slightly from intersegment ends 93 to 94 to allow for mechanical extraction of a graphite mandrel following densification. In some embodiments, braided fiber sleeves 96 can be densified via CVI or other process in step 126 to produce rigid structures that can be maintained during densification of preform 88 or 88' without the need for a temporary mandrel. In step 128, the plurality of braided fiber sleeves 96 can be enclosed in a plurality of fiber plies 98 or braided fiber sleeves 114 to produce preform 88 or 88', respectively. Fiber preform 88 or 88' can be densified with a ceramic matrix in step 130 using CVI, precursor infiltration and pyrolysis, slurry infiltration, melt infiltration, and combinations thereof as known in the art. Any tooling used to maintain cooling channels 90a-90c during densification can be removed in step 140. Additional processing or finishing procedures as known in the art can be performed, including deposition of a thermal barrier or environmental barrier coating. Apertures 92a and 92b can be ultrasonically machined through wall 108 of BOAS 70 to provide a conduit for cooling fluid $C_f$ into cooling channels 90a-90c.

The integral cooling channels constructed of CMC braided sleeves enable large film cooling access across the gas path face of the BOAS and reduce through-wall thermal gradients along the BOAS inner diameter wall. The use of CMC braided sleeves provides for seamless channel construction and can increase the specific stiffness of the BOAS, provide an efficient distribution of load, and provide resistance to crack propagation.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions, and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

DISCUSSION OF POSSIBLE EMBODIMENTS

The following are non-exclusive descriptions of possible embodiments of the present invention.

A fiber-reinforced component for use in a gas turbine engine according to an exemplary embodiment includes, among other possible things, a first braided fiber sleeve forming a cooling channel and a plurality of fiber plies enclosing the first braided fiber sleeve, with the plurality of fiber plies forming first and second walls separated by the first braided fiber sleeve. The fiber-reinforced component further includes a matrix material between fibers of the braided fiber sleeve and the plurality of fiber plies.

The fiber-reinforced component of the preceding paragraph can optionally include, additionally and/or alternatively, any one or more of the following features, configurations and/or additional components:

The fiber-reinforced component of the preceding paragraph can further include an aperture extending through the first wall into the cooling channel to provide cooling fluid to the cooling channel.

The fiber-reinforced component of any of the preceding paragraphs, wherein at least one of the plurality of fiber plies can be formed from a second braided fiber sleeve.

The fiber-reinforced component of any of the preceding paragraphs, wherein the second braided fiber sleeve can form an outermost fiber layer of the component.

The fiber-reinforced component of any of the preceding paragraphs, wherein the component can include a plurality of cooling channels formed from a plurality of braided fiber sleeves including the first braided fiber sleeve, wherein the plurality of braided fiber sleeves is enclosed by the plurality of fiber plies.

The fiber-reinforced component of any of the preceding paragraphs, wherein the plurality of braided fiber sleeves can have a compressed shape with radiused sides separated by elongated sides forming a cooling channel with a height ranging from 0.5 to 2 millimeters (20 to 80 thousandths of an inch).

The fiber-reinforced component of any of the preceding paragraphs, wherein the plurality of braided fiber sleeves can have a compressed shape with radiused sides having a radius ranging from 0.25 millimeters to 1 millimeter.

The fiber-reinforced component of any of the preceding paragraphs, wherein the component can be a blade outer air seal (BOAS) and wherein the plurality of cooling channels can extend in a circumferential direction relative to an engine axis.

The fiber-reinforced component of any of the preceding paragraphs, wherein the plurality of braided fiber sleeves and the plurality of fiber plies can comprise materials selected from the group consisting of: carbon fibers and ceramic fibers.

The fiber-reinforced component of any of the preceding paragraphs, wherein the plurality of braided fiber sleeves can comprise a triaxial braid.

The fiber-reinforced component of any of the preceding paragraphs, wherein each of the plurality of braided fiber sleeves forming the plurality of cooling channels can be formed from nested braided fiber sleeves, which form an outer diameter wall and an inner diameter wall, The fiber-reinforced component of any of the preceding paragraphs, wherein the matrix material can comprise a ceramic.

A method for manufacturing a fiber-reinforced component with integral fiber-formed cooling channels for use in a gas turbine engine according to an exemplary embodiment includes, among other possible things, forming a first braided fiber sleeve, consolidating the sleeve to form a cooling channel of a desired shape, enclosing the sleeve with a plurality of fiber plies to form a fiber preform of a component with internal cooling provided by the cooling channel, and densifying the fiber preform.

The method of the preceding paragraph can optionally include, additionally and/or alternatively, any one or more of the following features, configurations, additional components, and/or steps:

The method of the preceding paragraphs can further include densifying the first braided fiber sleeve prior to enclosing the first braided fiber sleeve with a plurality of fiber plies.

The method of any of the preceding paragraphs can further include forming the cooling channel by placing the first braided fiber sleeve on tooling and removing the tooling during or subsequent to densifying the fiber preform.

The method of any of the preceding paragraphs can further include forming a second braided fiber sleeve, consolidating the second braided fiber sleeve to form a second cooling channel of a desired shape, positioning the second braided fiber sleeve adjacent to the first braided fiber sleeve, and enclosing the second braided fiber sleeve with the plurality of fiber plies.

The method of any of the preceding paragraphs, wherein the plurality of fiber plies comprises a third braided fiber sleeve.

The method of any of the preceding paragraphs can further include positioning the third braided fiber sleeve around the first and second braided fiber sleeves and positioning the third braided fiber sleeve to form an outermost fiber layer of the fiber preform.

The method of any of the preceding paragraphs, wherein the first and second fiber sleeves can be formed from nested braided fiber sleeves, which form an inner diameter wall and an outer diameter wall.

The method of any of the preceding paragraphs, wherein the first and second braided fiber sleeves can comprise a triaxial braid.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fiber-reinforced component for use in a gas turbine engine, the fiber-reinforced component comprising:
   a plurality of cooling channels, each formed from a braided fiber sleeve; wherein each of the braided fiber sleeves is characterized as having at least one of:
      a compressed shape with radiused sides separated by elongated sides forming a cooling channel with a height ranging from 0.5 to 2 millimeters (20 to 80 thousandths of an inch); and
      a compressed shape with radiused sides having a radius ranging from 0.25 millimeters to 1 millimeter;
   a plurality of fiber plies enclosing the braided fiber sleeves, the plurality of fiber plies forming first and second walls separated by the braided fiber sleeves; and
   a matrix material between fibers of each of the braided fiber sleeves and the plurality of fiber plies,
   wherein one of the cooling channels is either:
      (a) fluidly connected to an adjacent cooling channel to receive cooling fluid from the adjacent cooling channel; or
      (b) fluidly separated from the adjacent cooling channel and fluidly connected to apertures extending through the first wall into the one of the cooling channels.

2. The fiber-reinforced component of claim 1, further comprising apertures extending through the first wall into cooling channel to provide cooling fluid to the cooling channel.

3. The fiber-reinforced component of claim 1, wherein at least one fiber ply of the plurality of fiber plies is formed from a braided fiber overwrap.

4. The fiber-reinforced component of claim 3, wherein the braided fiber overwrap forms an outermost fiber layer of the component.

5. The fiber-reinforced component of claim 1, wherein the component is a blade outer air seal (BOAS) and wherein the plurality of cooling channels extend in a circumferential direction relative to an engine axis.

6. The fiber-reinforced component of claim 5, wherein one of the cooling channels is fluidly connected to the adjacent cooling channel, and wherein the cooling channels are substantially closed at a first intersegment side of the BOAS.

7. The fiber-reinforced component of claim 1, wherein each of the braided fiber sleeves and the plurality of fiber plies comprise materials selected from the group consisting of carbon fibers and ceramic fibers, and/or wherein the matrix material comprises a ceramic.

8. The fiber-reinforced component of claim 1, wherein each of the braided fiber sleeves forming the plurality of cooling channels comprises nested braided fiber sleeves forming an outer diameter wall and an inner diameter wall, and/or wherein the plurality of braided fiber sleeves comprise a triaxial braid.

9. A method for manufacturing a fiber-reinforced component with integral fiber-formed cooling channels for use in a gas turbine engine, the method comprising:
   forming a plurality of braided fiber sleeves, wherein each of the braided fiber sleeves is characterized as having at least one of:
      a compressed shape with radiused sides separated by elongated sides forming a cooling channel with a height ranging from 0.5 to 2 millimeters (20 to 80 thousandths of an inch); and
      a compressed shape with radiused sides having a radius ranging from 0.25 millimeters to 1 millimeter;

consolidating each of the braided fiber sleeves to form a corresponding plurality of cooling channels of a desired shape;
enclosing each of the braided fiber sleeves with a plurality of fiber plies to form a fiber preform of a component with internal cooling provided by the plurality of cooling channels;
densifying the fiber preform; and
either:
- (a) fluidly connecting one of the cooling channels to an adjacent cooling channel such that it receives cooling fluid from the adjacent cooling channel; or
- (b) fluidly separating one of the cooling channels from the adjacent cooling channel and fluidly connecting the one of the cooling channels to apertures extending through a first wall (108) into the one of the cooling channels.

10. The method of claim 9, further comprising densifying the first braided fiber sleeve prior to enclosing the first braided fiber sleeve with a plurality of fiber plies.

11. The method of claim 9, further comprising:
forming the plurality of cooling channels by placing each of the plurality of braided fiber sleeves on a graphite or dissolvable tooling; and
removing the tooling during or subsequent to densifying the fiber preform.

12. The method of claim 9, further comprising:
forming the plurality of cooling channels by placing each of the plurality of braided fiber sleeves on a graphite or dissolvable tooling;
densifying the plurality of cooling channels; and
removing the tooling during or prior to densifying the fiber preform.

13. The method of claim 9, wherein the fiber-reinforced component is a blade outer air seal (BOAS) and the method further comprising:
closing the one of the plurality of cooling channels and the adjacent one of the plurality of cooling channels at an intersegment side of the BOAS.

14. The method of claim 9, wherein each of the plurality of braided fiber sleeves comprise a triaxial braid.

15. The method of claim 9, wherein each of the plurality of braided fiber sleeves comprises nested braided fiber sleeves forming an inner diameter wall and an outer diameter wall.

16. The method of claim 9 and further comprising:
extending apertures through the first wall to fluidly connect to respective cooling channels such that the apertures provide cooling fluid to the respective cooling channels.

* * * * *